P. H. JOYCE.
SANITARY BEER COOLER.
APPLICATION FILED MAY 28, 1909.

964,270.

Patented July 12, 1910.
2 SHEETS—SHEET 1.

Witnesses
Frank B. Hoffman

Inventor
Patrick H. Joyce
By Victor J. Evans
Attorney

P. H. JOYCE.
SANITARY BEER COOLER.
APPLICATION FILED MAY 28, 1909.

964,270.

Patented July 12, 1910.
2 SHEETS—SHEET 2.

Witnesses
D. B. Galt.
Wm Koerth

Inventor
Patrick H. Joyce,
By Victor J. Evans.
Attorney.

UNITED STATES PATENT OFFICE.

PATRICK H. JOYCE, OF PITTSBURG, PENNSYLVANIA.

SANITARY BEER-COOLER.

964,270.  Specification of Letters Patent.  Patented July 12, 1910.

Application filed May 28, 1909. Serial No. 498,938.

*To all whom it may concern:*

Be it known that I, PATRICK H. JOYCE, a citizen of the United States, residing at Pittsburg, in the county of Allegheny and State of Pennsylvania, have invented new and useful Improvements in Sanitary Beer-Coolers, of which the following is a specification.

This invention relates to an apparatus for cooling liquids contained in kegs and the invention resides in the novel arrangement and combination of parts hereinafter fully described and claimed.

Figures 1, 2:
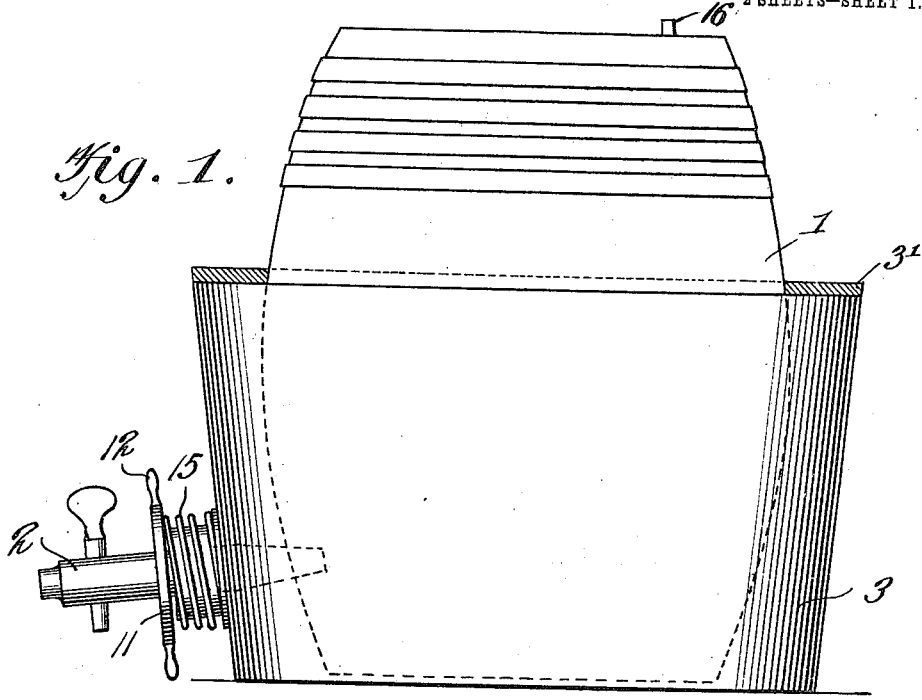
Figure 3:
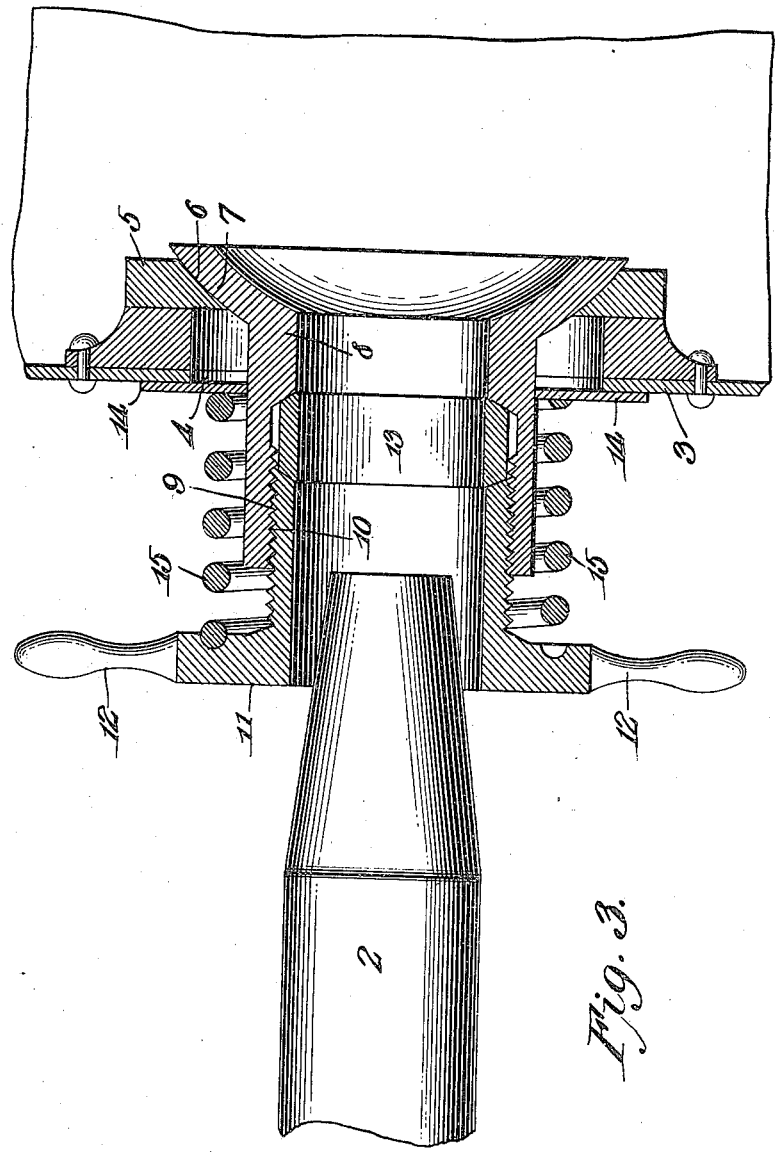

In the accompanying drawing there has been illustrated a simple and preferred embodiment of the invention and in which, Figure 1 is a side elevation of the improvement showing a vessel containing liquid positioned therein. Fig. 2 is an enlarged sectional view of the spigot sustaining apparatus. Fig. 3 is a similar sectional view illustrating the method of inserting the spigot.

In the accompanying drawing the numeral 1 designates a suitable keg or other vessel adapted for the reception of liquids. This keg 1 is provided with a spigot 2 whereby the liquid within the keg is drawn when desired. The keg 1 is adapted to be positioned within a suitable receptacle 3. This receptacle 3 is provided with an open mouth and is considerably larger than the keg 1 so as to leave a suitable space between the keg and the sides of the vessel or receptacle 3 which is adapted for the reception of ice whereby the contents within the keg are cooled.

The tub 1 is provided adjacent its lower edge with a suitable opening 4 and is also provided upon its inner face with a suitable ring member 5' having an opening coinciding with the said opening 4. The inner face of the ring 5' is flattened and is adapted to provide a bearing surface for a plate 5, which is centrally provided with an opening having its wall curved as designated by the numeral 6. The curved wall of the said opening is adapted for the reception of a cone-shaped head 7 provided upon a cross sectionally circular member 8. This member is adapted to entend a suitable distance beyond the edge of the receptacle 3 and is provided with interior threads 9 which are adapted for engagement with exterior threads 10 provided upon an extending nipple portion of the member 11. It will be thus understood that when the member 11 is loosened from the member 8, the flexible gasket 13 will be contracted so as to allow for the ready insertion of the spigot and at the same time the spring 15 will have its tension sufficiently reduced as to allow the member 6 to be moved in a desired direction in relation to the member or plate 5. This member 11 has oppositely disposed handles 12 whereby the said member may be rotated within the thimble of the member 8.

Positioned between the ends of the nipple of the member 11 and the wall adjacent the threads 9 provided by the extending portion of the member 8 is a flexible washer 13. This washer 13 is preferably constructed of rubber or other suitable analogous material which is adapted to expand under compression and it will be noted that when the member 11 is forced inwardly upon the member 8, the said gasket 13 will be compressed so as to expand its inner wall and whereby the gasket will tightly engage the face of the spigot 2.

The numeral 14 designates a plate which is provided with a central opening whereby the same is positioned upon the outer face of the member 8 and this plate is adapted to contact the face of the receptacle 3 and to form a closure for the opening 4 thereof. Bearing between the plate 14 and the inner face of the member 11 is a helical spring 15 which is adapted to exert pressure between these two members and to force the rounded portion 6 of the member 8 tightly into engagement with the rounded face 6 of the plate 5 and at the same time force the plate 14 tightly against the receptacle 3. When the device is to be operated the keg 1 is first positioned within the receptacle 3. The members 8 and 11 are untightened so as to allow for the free entrance of the body of the spigot 2. The spigot may be arranged at any desired angle so as to engage the bung hole of the keg. When the spigot is forced within the bung hole the member 11 is tightly secured upon the member 8 so as to compress the gasket 13 and to force the same into engagement with the body of the spigot, while at the same time the spring 15 exerting pressure between the plate 14 and the member 11 will tend to tightly retain the device in position. When the spigot has been inserted and the device tightened the space between the keg 1 and the inner wall of the receptacle 3 is filled with ice, and it will be noted from the above description taken in connection with the accompanying drawing that leakage from the receptacle 3 is entirely and effectively prevented.

By reference to Fig. 1 of the drawings it will be noted that I have provided a receptacle 3 with a suitable closure 3'. This closure 3' is provided with a central opening whereby the same may be fitted snugly over the barrel 1 and at the same time cover the opening between the sides of the barrel and the sides of the receptacle, thus preserving the ice within the receptacle. I have also provided the barrel 1 with a suitable nipple or valve 16 which is adapted for the reception of a pipe leading from a carbonic acid storage tank, thus providing means whereby the liquid within the barrel will flow freely therefrom when the valve of the spigot is open. The spigot 2 is inserted within the bung of the barrel in the usual manner, that is by first positioning the inner portion of the spigot against the bung and a violent tap upon the head of the spigot forces the bung within the barrel and the cone-shaped extension of the spigot is fitted tightly within the bung hole. This operation is performed so quickly that very little if any of the contents of the keg escapes.

Having thus described the invention what I claim as new is:—

1. In combination with a keg and a spigot therefor, a receptacle having a closure and being provided with an opening whereby the spigot may be inserted, and a barrel provided with the usual bung hole within the receptacle, a hollow member having a cone-shaped head adjacent the opening of the receptacle, said hollow member being provided with interior threads, a second member adapted to engage the threads of the first member, a resilient gasket between the members, resilient means for forcing the head of the first member against the opening of the receptacle to close the same and the gasket member adapted upon compression to contact the spigot after the latter has been inserted within the bung hole of the barrel, substantially as and for the purpose set forth.

2. The combination with a keg having a spigot therefor, of a receptacle, said receptacle being provided with an opening having a plate provided with a circular aperture, the walls of which are rounded, an integrally threaded hollow member having a bell shaped mouth engaging the opening of the plate, a second plate upon this member covering the opening of the receptacle, a handle member provided with a threaded extension engaging the threads of the first member, a flexible gasket between these members, and a resilient element adapted to exert pressure between the handle member and the plate upon the exterior of the receptacle.

In testimony whereof I affix my signature in presence of two witnesses.

PATRICK H. JOYCE.

Witnesses:
JOHN L. FLETCHER,
WM. KOERTH.